United States Patent Office 3,182,698
Patented May 11, 1965

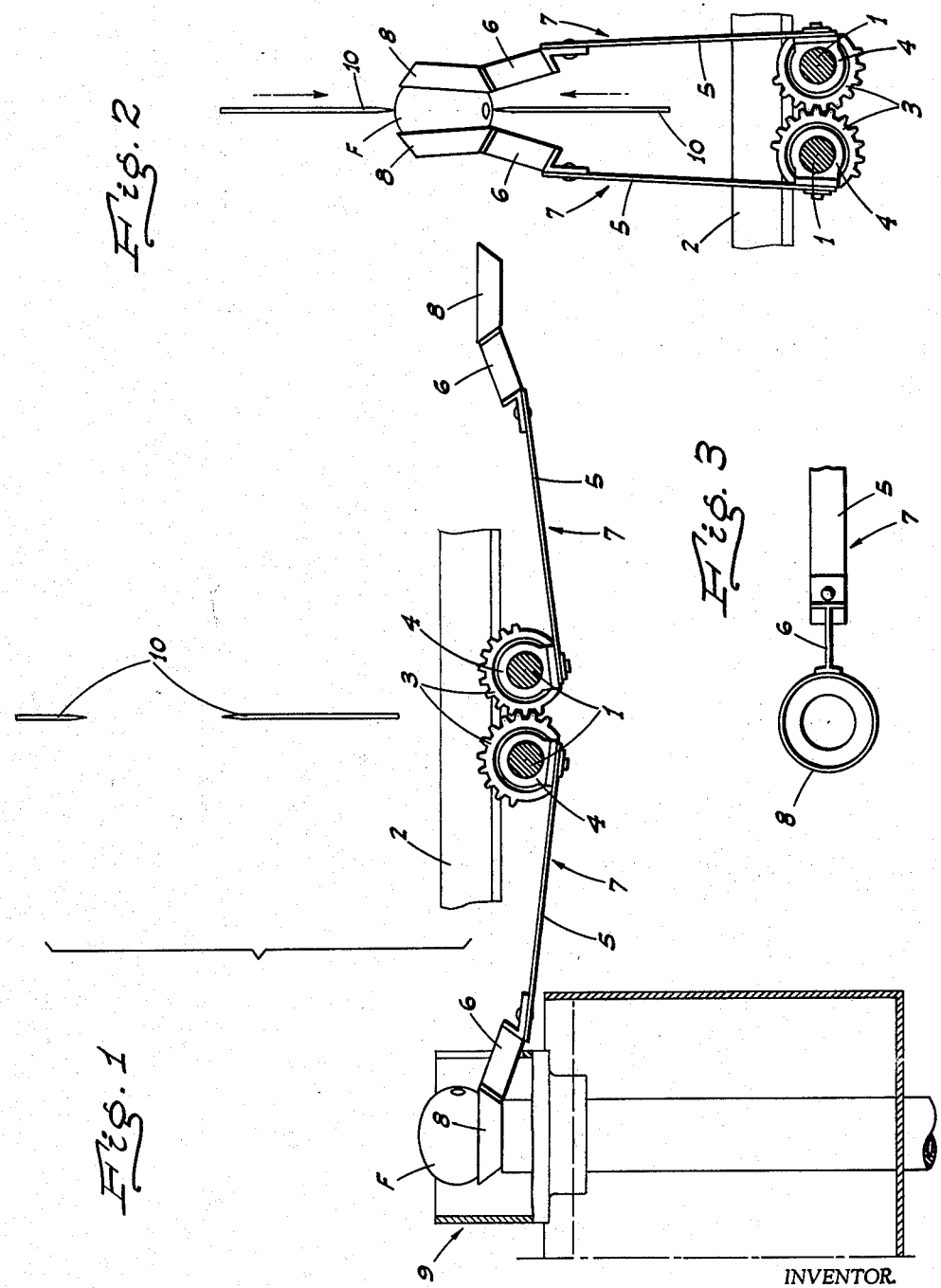

3,182,698
FRUIT POSITIONING CUP UNIT
Norman E. Gaddini, Rte. 1, Box 86, Winters, Calif.
Filed Dec. 24, 1963, Ser. No. 333,019
9 Claims. (Cl. 146—72)

This invention relates to fruit halving and pitting machines and particularly represents an improvement in the machine shown in my co-pending application Serial No. 216,529, filed August 13, 1962, now U.S. Patent 3,138,184; such machine having been especially designed for, but not limited to, halving and pitting apricots.

In operation of the identified machine, each apricot was first automatically oriented in and projected above an initially horizontal cup, and then the cup was swung upwardly to a substantially vertical position in which the apricot occupied a predetermined cutting position between vertically reciprocating halving knives. While in such cutting position, the portion of the apricot which then projected horizontally from the cup was engaged against an opposed flexible back stop plate having a flat face. This latter feature was found to be somewhat inefficient at times since there was nothing which actually supported the projecting portion of the apricot while it was being cut.

It is, therefore, the major object of the present invention to provide a fruit positioning cup unit wherein the fruit, while oriented in and swung upwardly by one cup as before, is engaged (in place of the aforesaid back stop plate) by another and opposed upwardly swingable cup by the time the fruit reaches the cutting position. In this manner the fruit is properly supported on both sides of the halving knives while the cutting operation is being effected, a more positive cutting or halving action results, and neither cut half of the fruit is likely to be damaged as was sometimes the case in the previous machine.

It is another important object of the present invention to provide a fruit positioning cup unit, as above, arranged so that, selectively, a fruit may be automatically oriented in and swung upwardly by said one cup while leaving the other and opposed upwardly swingable cup to act as a fruit supporting back stop, or said other cup may be initially loaded by hand while leaving said one and then empty cup to swing up and act as the fruit supporting back stop. When such other cup is being hand loaded and serving to swing fruit upwardly to cutting position, it is unnecessary to disturb, remove, or dismantle that portion of the machine employed to automatically orient fruit in said one cup.

A further object of the invention is to provide a fruit positioning cup unit which is designed for ease and economy of manufacture.

A still further object of the invention is to provide a practical, reliable, and durable fruit positioning cup unit and one which is exceedingly effective for the purpose for which it is designed.

These objects are accomplished by means of such structure and relative arrangement of parts as will fully appear by a perusal of the following specification and claims.

In the drawings:

FIG. 1 is a side elevation of the improved fruit positioning cup unit in its initial fruit receiving position; the relationship of the halving knives to the unit and to which the latter delivers being shown diagrammatically.

FIG. 2 is a similar view, but showing a fruit as elevated to cutting position.

FIG. 3 is a fragmentary top plan view showing one fruit receiving cup and a portion of the supporting arm unit.

Referring now more particularly to the drawings and to the characters of reference marked thereon, the fruit positioning cup unit comprises a pair of horizontal transversely spaced parallel shafts 1 which are suitably journaled in and supported from the machine frame indicated diagrammatically at 2; one of such shafts being intermittently oscillated by the mechanism shown in the aforementioned co-pending application. The shafts 1 are connected for rotation in unison but in opposite directions by meshing pinions 3.

A collar 4 is fixed on each shaft; the collars on the two shafts being in alinement transversely of the shafts. Secured on the collars and projecting away from each other are spring arms 5 disposed substantially tangentially of the collars; the width of the arms being in planes parallel to the shafts, and said arms being deflectible in said planes. At their outer ends, the arms 5 are connected to short rigid arms 6 which are quite narrow in a plane at right angles to the width of the arms 5, as clearly shown in FIG. 3. The corresponding arms 5 and 6 form arm units 7, both of the same length. The arms 6, at their outer ends, carry taper cups 8 adapted to receive and support a fruit F; the cups being materially shallower than the width of the fruit so that a considerable portion thereof projects from the cup as shown.

The cups 8 are disposed on their respective supporting arm units 7 so that when the latter are in their fully outstretched or lowered positions (as determined by the action of the shaft oscillating mechanism), the opposed and then lowered cups are on a common level with their axes vertical, as shown in FIG. 1.

One of the cups, when in such lowered position, co-operates with a fruit orienting unit indicated generally at 9, and which is here shown as being of the type shown in my co-pending application for patent, Serial No. 332,-717, filed December 23, 1963. The other cup, however, is not associated with any orienting unit, but cooperates with said one cup in the manner now to be described.

After a fruit has been received and oriented in said one cup by the unit 9, the shaft oscillating means functions to swing the arm units 7 upwardly and toward each other to a substantially vertical position and at which time the oriented fruit in and projecting from said one cup also becomes engaged on the opposite side and in fruit supporting, back stop relation by the other and opposed cup, as clearly shown in FIG. 2. The resilient nature of the arms 5 enables said arms, when the opposed cups 8 are engaged with the fruit, to yield and prevent the fruit from being possibly subjected to undue pressure by the cups before the rotation of the shafts 1 is halted.

Such halting takes place simultaneously and automatically when the arm units 7 have been swung up to a position in which the fruit F is centered (with its line of suture in a vertical plane) in a cutting position between a pair of opposed vertically reciprocable halving knives 10 as indicated in FIG. 2. Such halving knives 10 are mounted on the machine and reciprocated in the manner shown in the aforementioned U.S. Patent 3,138,184. Upon the halving knives 10 moving toward each other they engage and halve the fruit held in cutting position by the opposed cups 8 and at which time the cups are somewhat spaced apart to permit passage of the knives therebetween.

It will be noted that the short arms 6 are disposed relative to the cups 8 so that when said cups are in relatively close and facing relation, said arms 6 slope away from each other; each arm 6 being disposed at an angle approaching but less than 180 degrees to the related arm 5. Also, the then depending arms 5 are disposed at their upper ends adjacent the outer edges of the arms 6 at the lower ends thereof, all as shown in FIG. 2. This arrangement of the arm units 7 relative to the cups 8 better provides for the escape and dropping of the fruit halves from the cups when they start to spread apart and the knives begin to separate vertically after a cutting or halving operation. Further, any fruit half which may adhere to and remain on the lower knife 10, is not engaged and damaged by the arms 6 when swung upwardly during the next cutting and halving operation.

The automatic fruit orienting unit 9, which is associated or cooperates with one only of the cups 8, is particularly designed and adapted for use only with relatively small fruit of the general shape of an apricot. Without any change in the structure of the fruit positioning cup unit, as herein shown and described, the other of the cups may be used to receive larger and globose fruit, such as freestone peaches, when apricots are not being processed. In this case, the automatic orienting device while still present, is not used; the peaches being successively hand loaded and oriented on said other cup when in lowered position. Thereafter the fruit is raised to cutting position and halved in the same manner as hereinbefore described, except that the cup 8 corresponding to the unit 9 serves as the fruit supporting back stop.

In connection with the fruit positioning cup unit herein shown and described, it will be understood that in the complete machine of which such unit is a part, there is a row or bank of such units which are all connected to and controlled by the oscillation of the one pair of shafts 1.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A fruit positioning cup unit for a fruit halving machine which includes a pair of opposed vertically reciprocable knives initially spaced apart; the unit comprising a pair of horizontal transversely spaced shafts disposed in parallel below and symmetrical to the knives, an arm secured to and projecting laterally outwardly from each shaft, the arms being opposed in alinement and initially in a lowered position, means connecting the shafts together for rotative oscillation in unison and in opposite directions whereby to simultaneously swing the arms between said lowered position and an upstanding raised position, and a cup on the outer end of each arm; one cup being adapted to receive a fruit thereon, the arms being of equal length and when in raised position disposing the cups in adjacent but spaced facing relation, and said fruit then being engaged on opposite sides by the cups and supported between the knives.

2. A unit, as in claim 1, in which the arms and related cups occupy positions on opposite sides of the knives when said arms are in raised position; at least one of the arms being resilient.

3. A unit, as in claim 1, in which the arms and related cups occupy positions on opposite sides of the knives when said arms are in raised position; both arms being resilient.

4. A unit, as in claim 1, in which the arms are each formed with a bend which disposes the related cup in a higher plane when said arm is in lowered position.

5. A fruit positioning cup unit for a fruit halving machine which includes a pair of opposed vertically reciprocable knives initially spaced apart; the unit comprising a pair of horizontal transversely spaced shafts disposed in parallel relation in a common plane below and in symmetrical relation to the knives, means connecting the shafts together for rotative oscillation in unison and in opposite directions, an arm unit secured at one end on each shaft and projecting therefrom in a plane at right angles to the axis of the shaft, the arm units of the two shafts lying in a common plane transversely of the shafts and initially projecting in opposite directions and in outstretched relation to each other, and a cup on the outer end of each arm unit; the cups being in lowered position and disposed with their axes in vertical planes when the arm units are in such outstretched position, one cup being adapted to then receive a fruit thereon, and the length of the arm units being such that when the shafts are rotated to swing said arm units upwardly until the cups are raised to face each other in relatively close but spaced relation, the fruit as then engaged between both cups will be disposed between the knives.

6. A unit, as in claim 5, with a fruit orienting device on the machine cooperating with said one cup when the latter is in lowered position.

7. A unit, as in claim 5, in which each arm unit intermediate its ends but relatively close to the related cup, is formed with an upwardly facing angular bend therein which approaches 180 degrees in extent.

8. A unit, as in claim 5, in which each arm unit includes a relatively long resilient portion.

9. A unit, as in claim 5, in which each arm unit includes a relatively long resilient arm, means securing said arm at the inner end to the corresponding shaft in generally tangential relation thereto, and a short rigid arm extending between the related cup radially thereof and the outer end of the resilient arm and secured thereto; said short arm being disposed on edge relative to the related resilient arm and disposed at an upwardly facing angle approaching but less than 180 degrees thereto.

References Cited by the Examiner

UNITED STATES PATENTS

| | | | |
|---|---|---|---|
| 2,753,903 | 7/56 | Allison | 146—3 |
| 2,771,926 | 11/56 | Willsey | 146—2 |

J. SPENCER OVERHOLSER, *Primary Examiner.*